United States Patent
Yamashita et al.

(10) Patent No.: US 8,352,807 B2
(45) Date of Patent: Jan. 8, 2013

(54) SEMICONDUCTOR MEMORY DEVICE, HOST DEVICE AND SEMICONDUCTOR MEMORY SYSTEM

(75) Inventors: Hideaki Yamashita, Kyoto (JP); Takeshi Ootsuka, Hyogo (JP)

(73) Assignee: Panasonic Corporation, Osaka (JP)

( * ) Notice: Subject to any disclaimer, the term of this patent is extended or adjusted under 35 U.S.C. 154(b) by 200 days.

(21) Appl. No.: 12/652,790

(22) Filed: Jan. 6, 2010

(65) Prior Publication Data
US 2010/0174951 A1 Jul. 8, 2010

(30) Foreign Application Priority Data

Jan. 7, 2009 (JP) .................................. 2009-001442

(51) Int. Cl.
*G06F 11/00* (2006.01)

(52) U.S. Cl. .......................................... 714/54; 714/6.12

(58) Field of Classification Search ........................ 714/5
See application file for complete search history.

(56) References Cited

U.S. PATENT DOCUMENTS

| | | | | |
|---|---|---|---|---|
| 5,937,434 A * | 8/1999 | Hasbun et al. | ................. | 711/170 |
| 6,205,548 B1 * | 3/2001 | Hasbun | .............................. | 713/2 |
| 7,962,824 B2 * | 6/2011 | Nakanishi et al. | ............. | 714/747 |
| 2001/0008281 A1 * | 7/2001 | Niimi et al. | ......................... | 257/1 |
| 2002/0007469 A1 * | 1/2002 | Taketa et al. | ....................... | 714/6 |
| 2004/0054850 A1 * | 3/2004 | Fisk | ................................ | 711/112 |
| 2004/0205383 A1 * | 10/2004 | Sawaguchi | .......................... | 714/6 |
| 2007/0011581 A1 * | 1/2007 | Nakanishi et al. | ............. | 714/768 |
| 2009/0282191 A1 * | 11/2009 | Depta | ............................ | 711/113 |
| 2010/0082878 A1 * | 4/2010 | Inoue et al. | ...................... | 711/103 |
| 2010/0146189 A1 * | 6/2010 | Otterstedt et al. | ............. | 711/103 |

FOREIGN PATENT DOCUMENTS

JP 2006-318366 11/2006

* cited by examiner

*Primary Examiner* — Kamini Patel
(74) *Attorney, Agent, or Firm* — Renner, Otto, Boisselle & Sklar, LLP

(57) ABSTRACT

A host device 200A includes a data buffer 250. When data has been already written to a part of a physical block and data is additionally written to the physical block, it is determined whether or not the data written to the physical block is held in the data buffer. When the data is held, data is written to the block, and when an error exists, data in unit of physical blocks is rewritten. When the data is not held in the data buffer, a new physical block is required to be secured and then, data is written to the new block. Thereby, even when power is shut off or an error occurs during writing in the semiconductor memory device, destruction of data already written is prevented.

13 Claims, 19 Drawing Sheets

F I G. 5
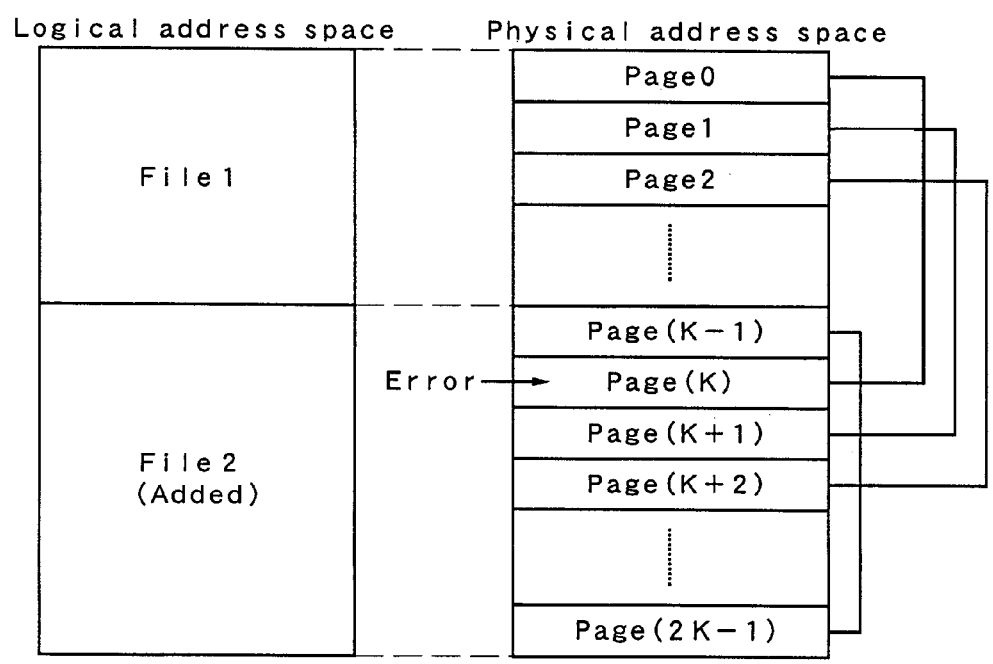

F I G. 7
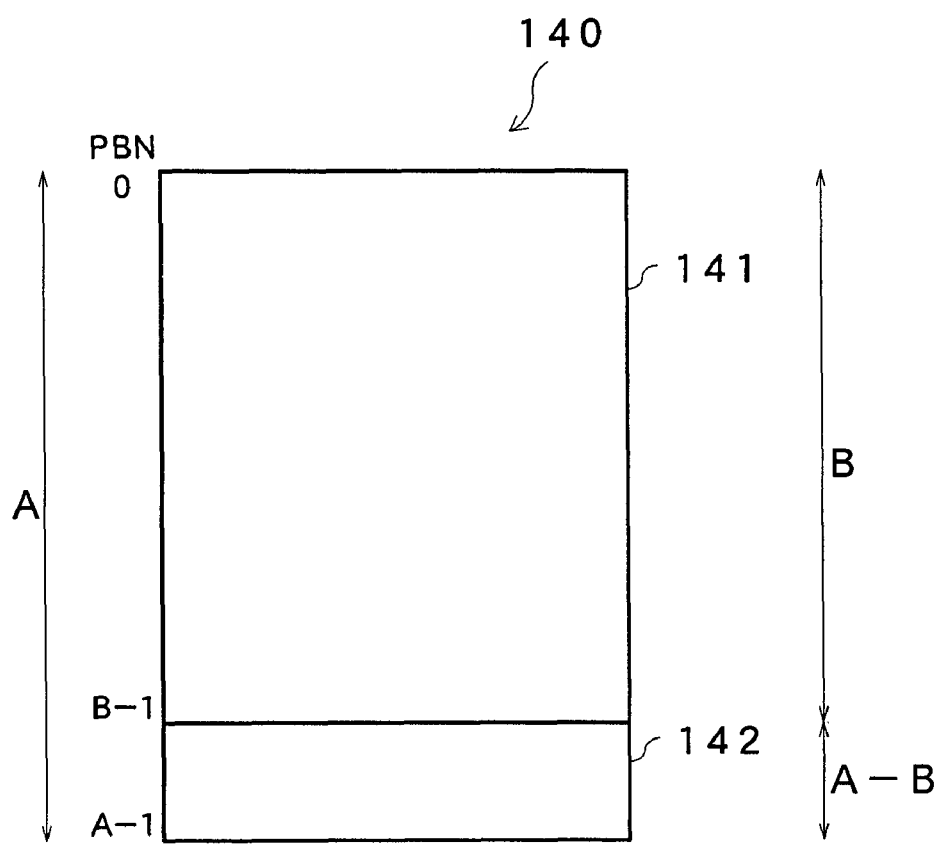

FIG. 8A

| Logical Block No. | 0 | 1 | ............ | L | L+1 | ............ | B−m |
|---|---|---|---|---|---|---|---|
| Physical Block No. | 3 | 6 | | A | A | | B−2 |

| Logical Block No. | |
|---|---|
| Physical Block No. | |

FIG. 9

| Physical Block No. | 0 | 1 | 2 | 3 | ........................ | B−1 |
|---|---|---|---|---|---|---|
| Use state | 1 | 0 | 0 | 1 | | 0 |

| Logical Block No. | 0 | 1 | 2 | ……… | 6 | 7 | ……… | B−m |
|---|---|---|---|---|---|---|---|---|
| Physical Block No. | 0 | 1 | 2 | | 6 | A | | B−2 |

| Logical Block No. | 2 |
|---|---|
| Physical Block No. | 10 |

F I G. 18A

171a

| Logical Block No. | 0 | 1 | 2 | ............ | 6 | 7 | ............ | B−m |
|---|---|---|---|---|---|---|---|---|
| Physical Block No. | 0 | 1 | 20 | | 6 | A | | B−2 |

F I G. 18B

171b

| Logical Block No. | 2 |
|---|---|
| Physical Block No. | A |

F I G. 1 9 B
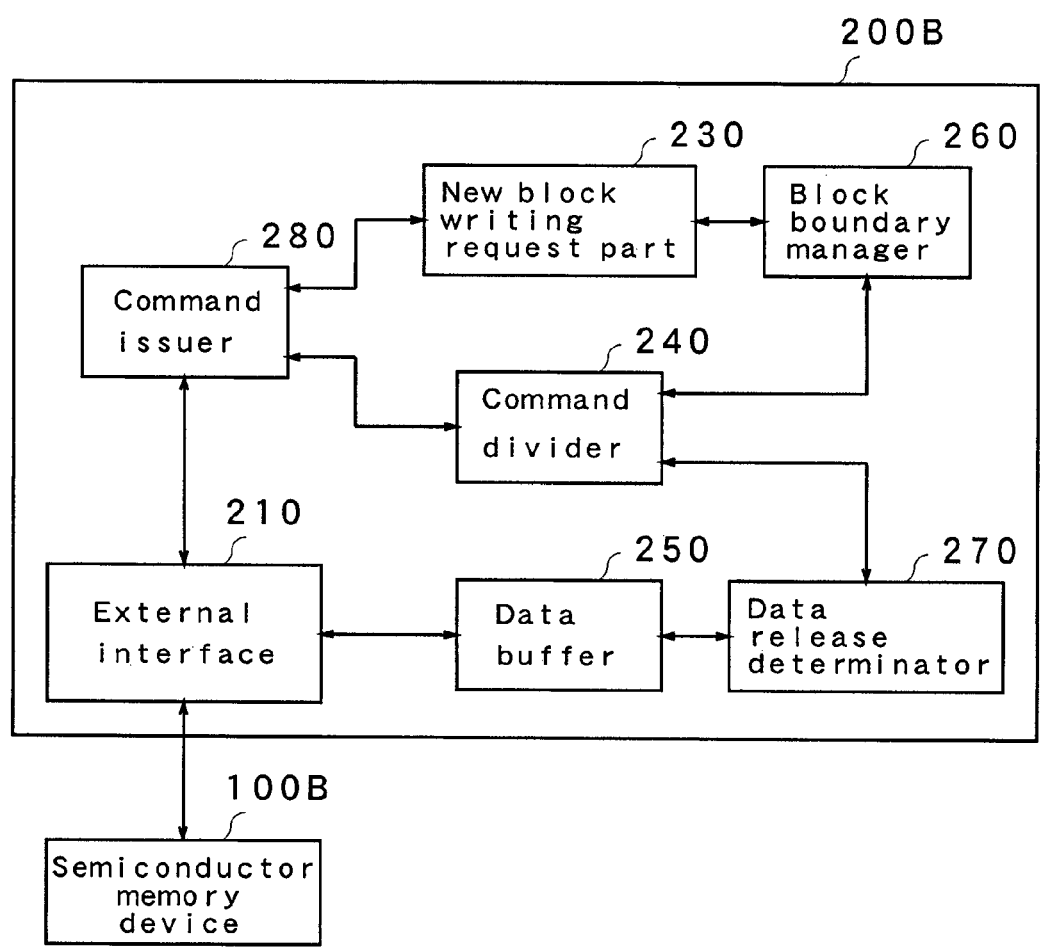

SEMICONDUCTOR MEMORY DEVICE, HOST DEVICE AND SEMICONDUCTOR MEMORY SYSTEM

BACKGROUND OF THE INVENTION

1. Field of the Invention

The present invention relates to a semiconductor memory device such as a memory card, host device and semiconductor memory system, in particular, to a technique for recovering a writing error occurring in a nonvolatile memory within the semiconductor memory device.

2. Discussion of the Related Art

Conventionally, a semiconductor memory device such as an SD (Secure Digital) card as a card-type recording medium which has a flash memory therein is very small and thin and due to its handiness, is widely used for recording data such as images in a digital camera, portable equipment and so on.

The flash memory contained in the semiconductor memory device is a nonvolatile memory which can erase and rewrite data in units of block of a uniform size. To address a demand for an increase in capacity in recent years, the flash memory capable of storing data of two bits or more in one cell has been commercialized.

Referring to FIGS. 1A, 1B and 2, relationship between the number of electrons accumulated in a floating gate of an MCL (multi-level cell) flash memory (hereinafter referred to as a multi-level flash memory) which expresses 2-bit information per cell and a threshold voltage (Vth).

FIG. 1A shows a configuration of one cell of a flash memory. A flash memory 10 is configured by forming an N-channel source and drain electrodes 12, 13 on a P-channel substrate 11 and laminating a tunnel oxide film 14, a floating gate 15, an insulating oxide film 16 and a control gate 17 between the source electrode 12 and drain electrode 13. Thus, as distinct from a volatile dynamic random access memory (DRAM), the flash memory has the floating gate 15 as an area for holding an electrical charge within a transistor. A voltage threshold during current flows changes depending on a state of the electrical charges accumulated in the floating gate 15. FIG. 1A shows an initial state before data writing where electrical charges are not accumulated and FIG. 1B shows a state where electrical charges are accumulated and data is written.

FIG. 2 shows an example of relationship between the number of electrons accumulated in the floating gate of a multi-level flash memory and a threshold voltage (Vth). In a case of a binary flash memory, a voltage during the current flows changes depending on the presence or absence of electrons in the floating gate. However, in a case of a four-level flash memory expressing 2-bit information per cell, four threshold voltages during the current flow exist depending on the amount of electrical charges. As shown in FIG. 2, in the four-level flash memory, an electron accumulating state in the floating gate is managed in four states according to its threshold voltage (Vth). An electric potential in an erasure state is the lowest and this state is defined as (1, 1). As electrons are accumulated, the threshold voltage discretely rises and these states are defined as (1, 0), (0, 0) and (0, 1). Since the electrical potential rises in proportion to the number of accumulated electrons, data of two bits can be recorded in one memory cell by controlling the electrical potential so as to fall below a predetermined threshold value.

FIG. 3 is a schematic diagram of one physical block of the four-level flash memory. The physical block shown in FIG. 3 is formed of 2K (K is a natural number) pages. Writing processing is performed from a page number 0 in ascending order. Here, it is assumed that a page with a page number m (0=m<K) and a page with a page number (K+m) share one memory cell (hereinafter referred to as cell sharing relationship). In pages having the cell sharing relationship, a page to be written first is referred to as a first page and a page to be written next is referred to as a second page. In other words, writing to the page number m (writing to the first page) and writing to the page number (K+m) (writing to the second page) mean that electrons are charged to a same cell. Describing referring to FIG. 2, it is controlled so that the electrical potential only rises up to a half at a maximum in writing to the first page and rises from the half to the maximum in writing to the next second page.

FIG. 4 shows shift of the state of the flash memory cell. As shown in FIG. 4, a state of one memory cell of a physical block of the flash memory shifts as follows.

(a) The memory cell state is (1, 1) after data erasure.

(b) The memory cell state is (1, 1) or (1, 0) after writing to the first page.

(c) The memory cell state is (1, 1), (1, 0), (0, 0) or (0, 1) after writing to the second page.

As described above, in the multi-level flash memory, multi-level recording of providing a plurality of states of the threshold voltage Vth and controlling an amount of accumulated electrons is performed, thereby realizing an increase in capacity.

The above-mentioned cases (b), (c) will be described in more detail. In the case (b), a state after 1 is written to a corresponding logical page is (1, 1). A state after 0 is written is (1, 0). In the case (c), shift is limited depending on the state of the case (b). That is, in shift from the state (1, 1) in (b), the state (1, 1) is maintained when 1 is written and the state (1, 1) shifts to the state (0, 1) when 0 is written. Meanwhile, in shift from the state (1, 0) in (b), the state (1, 0) is maintained when 1 is written and the state (1, 1) shifts to the state (0, 0) when 0 is written. Thus, in a same physical page, a value in the first page is reflected on a second bit and the value in the second page to be written next is reflected on a first bit.

The flash memory uses a tunnel oxide film 14 having an insulating function to hold the electrical charges accumulated in the floating gate 15. In writing and erasure, electrons pass through the oxide film and thus, an oxide film becomes to deteriorate. When writing is repeated, the oxide film is damaged and cannot act for insulation. For this reason, the flash memory has the feature that the number of times of writing is limited.

Next, an occurrence of the write error will be described. In the case of the four-level flash memory, the memory cell is shared by two logical pages of the first page and second page. Writing to the pages 0 to (K−1) in FIG. 3 is writing to the first page. In this case, a write error is due to that Vth does not rise from the state of (1, 1) to the state of (1, 0). Writing to pages K to (2K−1) in FIG. 3 is writing to the second page and a state of Vth becomes (1, 1), (1, 0), (0, 0), (0, 1). In this case, the write error is due to that:

(Error 1) Vth does not rise from (1, 0) to (0, 0); and
(Error 2) Vth does not from (1, 0) to (0, 1).

Vth (1, 0) is adjacent to Vth (0, 0) in the case of the error 1, while two states are interposed between Vth (1, 1) and Vth (0, 1) in the case of the error 2. Especially Vth (1, 0) is a value after writing to the first page and in a case where Vth only rises to (1, 0) after writing to the second page, the second page has a write error, further causing corruption of data in the first page.

Next, the possibility that the write error destroys another file will be described in more detail. A left side in FIG. 5 shows a logical block in a logical address space and corresponds to the physical block in a physical address space of a flash memory in a right side in FIG. 5. A file 1 has been already written to the physical block and a file 2 is added later. It is assumed that the file 1 has been already recorded from the page 0 to the page (K−2) in the physical address space and the file 2 is added from the page (K−1) to the page (2K−1). In this example, for simplification of description, the gages are used in ascending order. During writing of the file 2, for example, as shown in FIG. 5, data written to the page 0 can be destroyed due to a write error occurred during writing to the page k or sudden power disconnection. In other words, when the data in the page 0 is destroyed, the file 1 may be also destroyed by writing of the file 2.

To solve this problem, in Japanese Unexamined Patent Publication No. 2006-318366, a memory controller for controlling a flash memory is provided with a buffer memory and data in a first page is stored in the buffer memory until writing to a second page is completed, and when a write error occurs due to writing to the second page, the data in the buffer memory is loaded and the data in the first page is also written to the flash memory.

SUMMARY OF THE INVENTION

However, according to a conventional method, the data in a first page needs to be held in a buffer memory until writing to a second page is completed. When a plurality of files are written to one physical block, data other than a file which is being written is data written in the past and the data does not exist yet in a host device or semiconductor memory device. For this reason, disadvantageously, there are cases that retry cannot be performed and thus, data recovery is impossible.

When power disconnection suddenly occurs during data writing, even if data for recovery is held, retry itself cannot be performed, resulting in that the data cannot be disadvantageously recovered.

To solve the above-mentioned problems, an object of the present invention is to provide a highly reliable semiconductor memory device, host device and semiconductor memory system in which even when data which is written in the nonvolatile memory but is not stored in the buffer of the host device or semiconductor memory device exists, a writing error does not propagate to the stored data at new writing.

To solve the problems, a semiconductor memory system of the present invention comprises: a host device; and a semiconductor memory device, wherein said semiconductor memory device includes: a nonvolatile memory composed of a plurality of physical blocks; a data writer for writing data to said nonvolatile memory; a data reader for reading data from said nonvolatile memory; a memory manager having a logical-physical conversion table recording correspondence between a logical block according to a command issued from the host device and physical block of said nonvolatile memory, the memory manager converting a logical address given from said host device into a physical address of said nonvolatile memory; and a memory information informer for informing memory information on said nonvolatile memory, wherein said host device includes: a block boundary manager for managing a boundary of the physical block as a writing unit based on the memory information informed from said memory information informer of said semiconductor memory device; a command divider for dividing data to be written and a write command based on an access unit from said block boundary manager to the physical block; a data buffer for storing data to be written upon issuing a write command; a command issuer for issuing a write command to said semiconductor memory device, and in a case of a writing error occurs at writing to said semiconductor memory device, reading data to be written to a block in which a writing error occurs from said data buffer and reissuing the write command; and a data release determinator for determining whether or not data stored in said data buffer is released based on an error propagation range.

Said data release determinator may determine that the data of said data buffer is released when data transfer is completed in units of physical blocks.

When an error occurs, said command issuer may reissue a write command to the whole of the physical block when data in unit of physical blocks exists in said data buffer, and reissue the command with error when no data in unit of physical blocks exists in said data buffer.

Said host device further may include a new block writing request part for requesting writing to a new block at writing of data when said data buffer does not hold data recorded in the block to which the data is to be written in said semiconductor memory device.

Said new block writing request part may request writing to the new block when a first write command after power-on is issued.

Said semiconductor memory device further may include an error propagation detector for determining whether or not the error affects an area other than an address area of the command as an error status when the write command leads to the writing error, and informing the error status to said host device, and said command issuer may reissue the write command to the whole of a predetermined physical block when the error status shows that the error affects an area other than the address area of the command, and reissue the command leading to the writing error when the error status shows that the error does not affect an area other than the address area of the command.

Said nonvolatile memory may be a multi-level flash memory and given that units sharing a memory cell are regarded as a group, said physical block may include at least one group.

Said physical block may be one of a minimum erasure unit and an integral multiple of the minimum erasing unit of said memory.

To solve the problems, a host device of the present invention connected to a semiconductor memory device comprises: a block boundary manager for managing a boundary of a physical block as a writing unit based on the memory information on said semiconductor memory device; a command divider for dividing data to be written and a write command based on an access unit from said block boundary manager to the physical block; a data buffer for storing data to be written at issuance of a write command; a command issuer for issuing a write command to said semiconductor memory device, and when a writing error occurs at writing to said semiconductor memory device, reading data to be written to the block in which a writing error occurs from said data buffer and reissuing the write command; and a data release determinator for determining whether or not data stored in said data buffer is released based on an error propagation range.

Said data release determinator may determine that said data buffer is released when data transfer in units of physical blocks is completed.

When the error occurs, said command issuer may reissue a write command to the whole of the physical block when data in unit of physical blocks exists in said data buffer, and reissue the command with the error when no data in unit of physical blocks exists in said data buffer.

Said host device further may include a new block writing request part for requesting writing to a new block at writing of data when said data buffer does not hold data recorded in the block to which the data is to be written in said semiconductor memory device.

Said new block writing request part may request writing to the new block when a first write command after power-on is issued.

To solve the problems, a semiconductor memory device of the present invention connected to a host device comprises: a nonvolatile memory composed of a plurality of physical blocks, a data writer for writing data to said nonvolatile memory, a data reader for reading data from said nonvolatile memory, a memory manager having a logical-physical conversion table representing correspondence between a logical block according to a command issued from said host device and a physical block of said nonvolatile memory, the memory manager converting a logical address given from said host device into a physical address of said nonvolatile memory, and a memory information informer for informing memory information on said nonvolatile memory.

The semiconductor memory system according to the present invention is provided with a data release determinator to release data in the data buffer in units of the predetermined blocks when data transfer in units of the predetermined blocks is completed. Thereby, even when error propagation accompanying the cell sharing occurs, writing can be performed again using the data in the data buffer, thereby enabling prevention of data destruction due to the error propagation.

Furthermore, according to the claims 4, 5, 12 and 13 of the present invention, the host device is provided with the new block writing request part and when writing is performed in a case where the host device does not hold data in a cell sharing part, the new block writing request part expressly requests writing to a new block to the semiconductor memory device and allows writing data to a newly secured block. Thereby, it is possible to provide a highly reliable semiconductor memory system which eliminates an effect of the error propagation due to the cell sharing.

BRIEF DESCRIPTION OF THE DRAWINGS

FIG. 5 is an explanatory diagram showing error propagation caused by file addition in a case of the multi-level flash memory;

FIG. 7 is an explanatory diagram showing a memory area of the flash memory;

FIG. 8A is an explanatory diagram showing a logical-physical conversion main table in the present embodiment;

FIG. 8B is an explanatory diagram showing a logical-physical conversion auxiliary table in the present embodiment;

FIG. 9 is an explanatory diagram showing a free block management table in the present embodiment;

FIG. 16A is an explanatory diagram of a logical-physical conversion main table in which one logical block is formed of two physical blocks in the present embodiment;

FIG. 16B is an explanatory diagram of a logical-physical conversion auxiliary table in which one logical block is formed of two physical blocks in the present embodiment;

FIG. 18A is an explanatory diagram of the logical-physical conversion main table in which one logical block is formed of one physical block in the present embodiment;

FIG. 18B is an explanatory diagram of the logical-physical conversion auxiliary table in which one logical block is formed of one physical block in the present embodiment;

FIG. 19B is a configuration diagram showing a host device in accordance with the second embodiment of the present invention.

DESCRIPTION OF THE PREFERRED EMBODIMENTS (First Embodiment)

Figure 6A:
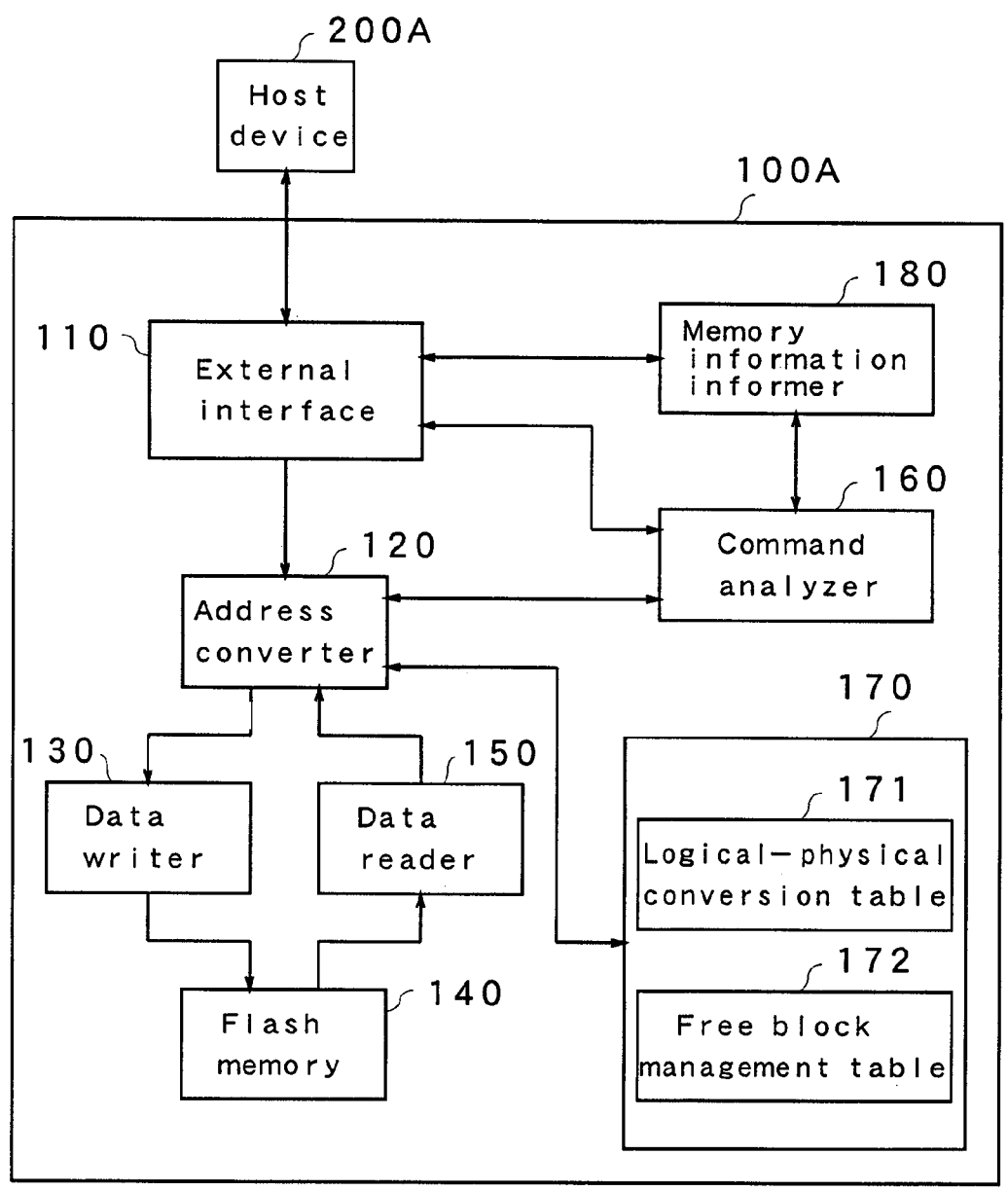
FIG. 6A is a configuration diagram showing a semiconductor memory device in accordance with a first embodiment of the present invention.
Figure 6B:
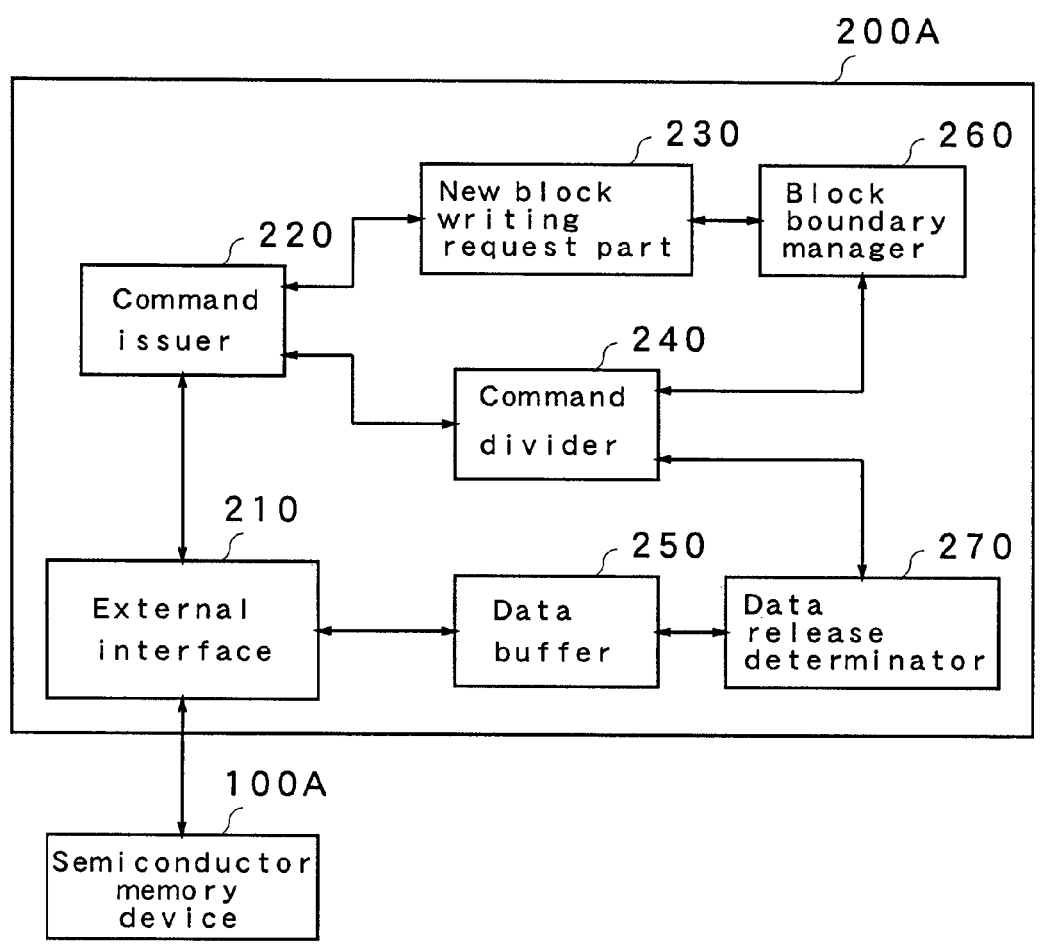
FIG. 6B is a configuration diagram showing a host device in accordance with the first embodiment of the present invention.

FIGS. 6A and 6B are configuration diagrams showing a semiconductor memory system in accordance with a first embodiment of the present invention. The semiconductor memory system includes a semiconductor memory device 100A and host device 200A. The semiconductor memory device 100A stores data therein according to a write command from the host device 200A, and reads data according to a read command and sends the data to the host device 200A. The host device 200A controls the semiconductor memory device 100A and performs data writing and data reading.

Next, each block in the semiconductor memory device 100A in the present embodiment will be described referring to FIG. 6A. An external interface 110 is an interface for receives a command and data from the host device 200A and transferring the data.

An address converter 120 converts a logical address at which the host device 200A request data reading/writing to an address of a physical memory in the semiconductor memory device 100A based on a logical-physical conversion table described later.

A data writer 130 records data transferred from the external interface 110 in each page of a physical block of a flash memory 140. When an error occurs at data writing, an error status is transmitted to the host device 200A through the interface 110.

Figure 1A:
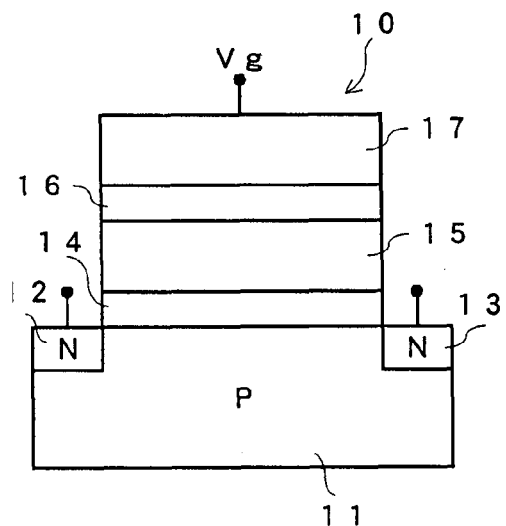
FIG. 1A is a schematic diagram showing a structure of a multi-level flash memory.
Figure 1B:
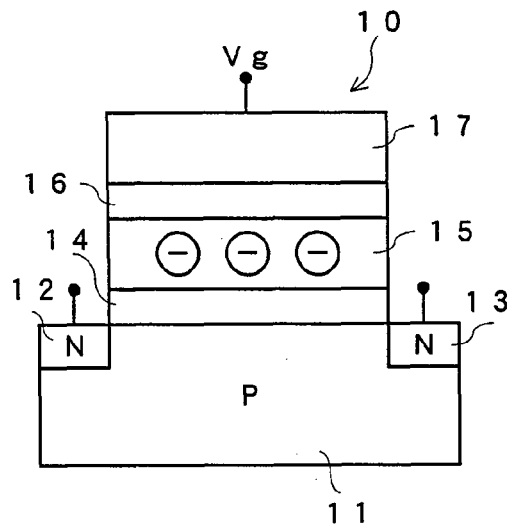
FIG. 1B is a schematic diagram showing a state where electrical charges are accumulated in the multi-level flash memory.
Figure 2:
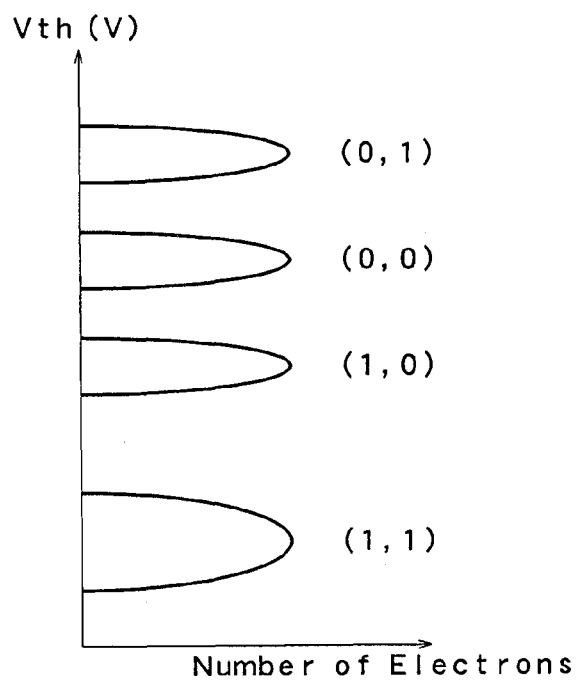
FIG. 2 is a schematic diagram showing an electron accumulating state of the multi-level flash memory.
Figure 3:
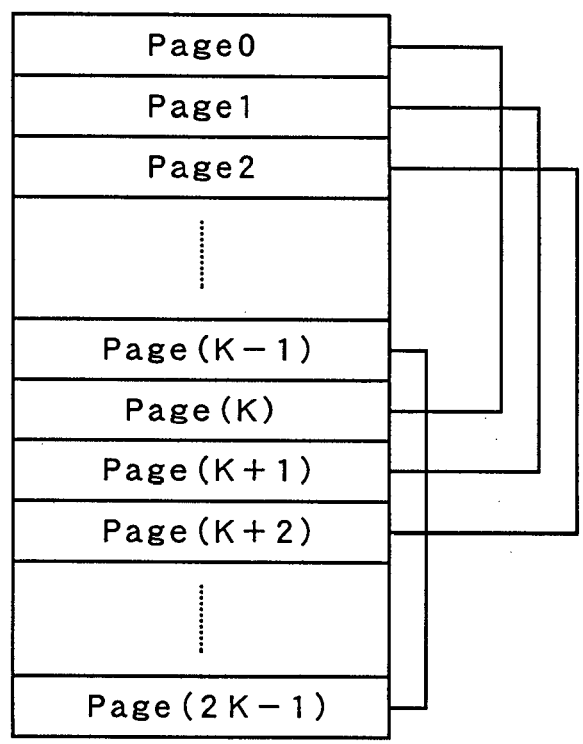
FIG. 3 is a diagram showing cell sharing in a physical block of the multi-level flash memory.
Figure 4:
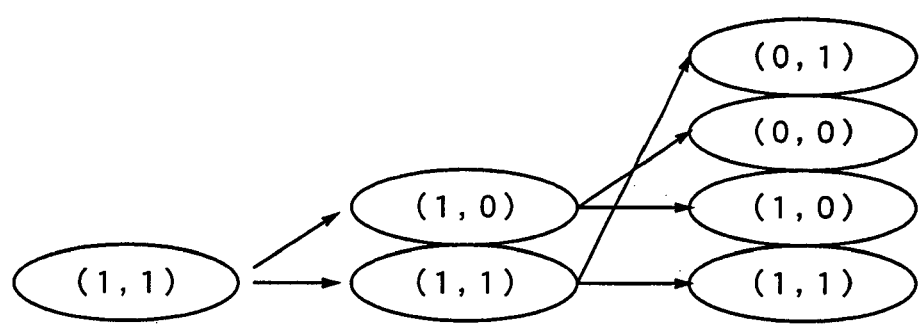
FIG. 4 is a diagram showing transition of a cell state of the multi-level flash memory.

The flash memory 140 is a four-level flash memory and includes many physical blocks. Each of the physical blocks is an erasing unit and has 2K (K is natural number) pages. As shown in FIG. 3, the inside of the flash memory is managed by the page number of 0 to (2K−1). K pages with the page numbers 0 to (K−1) are formed of first pages of the memory cells and K pages with the page numbers K to (2K−1) are formed of second pages of the memory cells. Although one flash memory is used herein, a plurality of flash memories may be used in parallel.

A data reader 150 reads data from the physical block of the flash memory 140 corresponding to a designated logical block when the host device 200A issues a read command.

A command analyzer 160 analyzes commands such as a read write command and write command issued from the host device.

A block manager 170 includes a logical-physical conversion table 171 and free block management table 172. The logical-physical conversion table 171 associates the logical block indicated from the host device with an address of the physical block in the flash memory which corresponds to the logical block. In the present embodiment, the logical-physical conversion table 171 is stored using an area of a part of the flash memory 140. The free block management table 172 is generated after power-on and represents availability or unavailability of each physical block.

The block manager 170 registers and updates these tables. In data writing, the block manager 170 extracts a new physical block corresponding to the logical block referring to the free block management table 172. The block manager 170 updates the logical-physical conversion table 171 when the new logical block is assigned to the physical block. Here, the address converter 120 and the block manager 170 are collectively referred to as a memory manager for managing the memory.

A memory information informer 180 informs specification of the flash memory 140, that is, the size of the physical block, the number of flash memories to the host device 200A through the external interface 110.

Next, each block of the host device 200A in the present embodiment will be described referring to FIG. 6B. The external interface 210 transmits a command and transfers data to the semiconductor memory device 100A, and receives data and memory information read from the semiconductor memory device 100A.

A command issuer 220 generates a write command and read command to the semiconductor memory device 100A.

The new block writing request part 230 requests data writing after securing a new physical block in the semiconductor memory device 100A, adds the request to the write command from the command issuer 220 and sends the request to the semiconductor memory device 100A.

When the host device 200A writes data to the semiconductor memory device 100A, a command divider 240 divides the data to be written into write commands for data having a certain size based on the host device 200A and specification of flash memory of semiconductor memory device 100A.

A data buffer 250 is a memory for temporarily holding data therein and frequently secures and releases data according to processing at the host device 200A. The data buffer 250 also holds data in an area subjected to error propagation in preparation for error occurrence, in addition to data transferred to the semiconductor memory device 100A, therein. The data buffer 250 is generally managed by software of the host device 200A. When data transfer is required, a part of the area of the data buffer 250 is secured and data is prepared here to transfer the data. When the data transfer is finished, the secured area is released in order to be used for another processing.

A block boundary manager 260 holds information on a physical block of the flash memory mounted in the semiconductor memory device 100A therein. When the host device 200A writes data to the semiconductor memory device 100A, the block boundary manager 260 identifies a range of error propagation based on the size and boundary of the physical block.

A data release determinator 270 determines whether or not data in the data buffer 250 is released. The data release determinator 270 allows the data buffer 250 to hold data therein so that rewriting can be performed even when an error propagates to the data already written to the physical block based on the state where the data is recorded in the semiconductor memory device 100A, and releases the data buffer 250 when the possibility of error propagation vanishes.

Next, FIG. 7 shows an area map of the flash memory 140. The flash memory 140 is formed of A (A is a natural number) physical blocks and in the present embodiment, physical block numbers 0 to (A−1) are assigned to the A physical blocks, respectively. One physical block includes at least one group sharing the memory cell of the multi-level flash memory.

Then, B physical blocks with the physical block numbers 0 to (B−1) (B is a natural number which is smaller than A) form a first area 141 of the flash memory 140 and (A−B) physical blocks with the physical block numbers B to (A−1) form a second area 142 of the memory. User data transferred from the host is recorded in the first area 141 of the flash memory 140 and system data such as the logical-physical conversion table 171 is recorded in the second area 142.

Given that the logical block numbers are 0 to (B−m) (m>1), the number of physical blocks in the first area of the flash memory, which correspond to the logical blocks, is allocated to be larger than the number of the logical blocks. Thereby, in a case where the written logical block is rewritten, data can be written to the physical block other than the written physical blocks corresponding to the logical blocks. Thus, even when the write commands are intensively issued from the host device to the same logical block, it is possible to prevent that data is intensively written to the same physical block.

The flash memory has following features:
(a) Data cannot be overwritten to the written page; and
(b) The flash memory has the life of rewrite number.

For this reason, the block manager 170 generates the logical-physical conversion table 171 showing correspondence between the logical block number and the physical block number and manages the table.

The block manager 170 will be described below in detail. As shown in FIGS. 8A and 8B, the logical-physical conversion table 171 includes a logical-physical conversion main table (hereinafter referred to as merely a main table) 171a and a logical-physical conversion auxiliary table (hereinafter referred to as merely an auxiliary table) 171b. The main table 171a shows that a logical block with the logical block number LB0 is mapped to a physical block with the physical block number PB3 and a logical block with the logical block number LB1 is mapped to a physical block with the physical block number PB6. An invalid number A is recorded as a corresponding physical block in the logical blocks with logical block numbers LBL and LB (L+1). This means that no data is written in the logical blocks LBL, LB (L+1).

The auxiliary table 171b shown in FIG. 8B holds the number of the physical block added when a plurality of physical blocks are allocated to one logical block. The number of registrations in the auxiliary table 171b is at least 1 and here, it is assumed that the number of registrations is 1.

The block manager 170 manages the blocks of the whole semiconductor memory device while managing the free block management table 172. FIG. 9 shows an example of the free block management table 172 and represents a use state of each physical block. The physical block in a use state 1 is being used and the physical block in a use state 0 is a free block and can be newly used.

When power is supplied, the block manager 170 initializes all blocks in the free block management table 172 to be put into a free state and updates a bad block to be a used block. Since management of a bad block falls outside of the subject matter of the present invention, detailed description thereof is omitted. The bad block is written to a fixed position of the flash memory. Next, the block manager 170 reads the logical-physical conversion table 171 and updates the used physical block to be a used block based on the logical-physical conversion table 171. When the written logical block is rewritten, the block manager 170 randomly searches the free block management table 172 to select a free physical block as a new physical block. When data is written to the selected physical block, the block is updated to be a used block and a previous physical block corresponding to the logical block is updated to be a free block.

Figure 10:
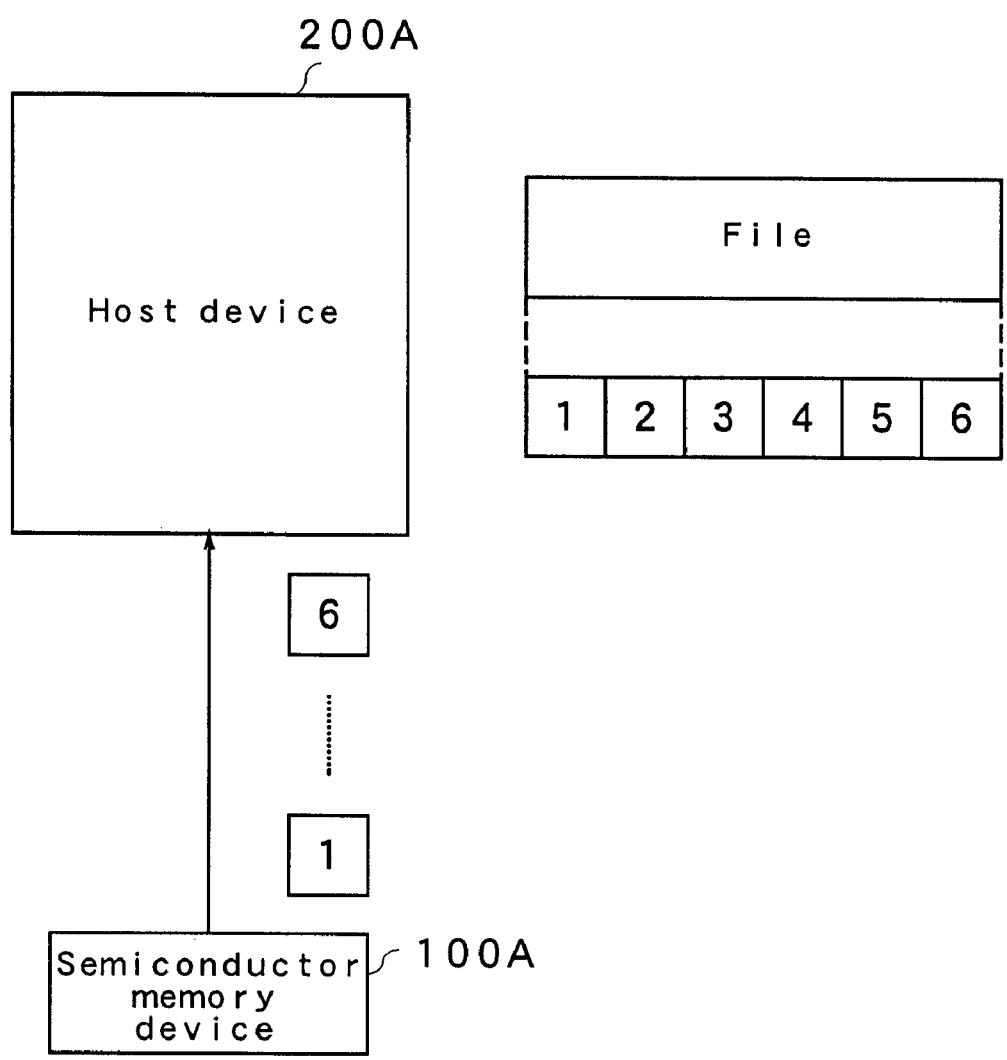
FIG. 10 is an explanatory diagram showing file transfer in accordance with the present embodiment of the present invention.

Processing of transferring and writing a file in the host device 200A to the semiconductor memory device 100A will be schematically described referring to FIG. 10. First, when an application on the host device 200A writes the file to the semiconductor memory device 100A, a file system finds a logical address to be written to the semiconductor memory device 100A. Upon writing to the semiconductor memory device 100A, due to limitation of size of the data buffer 250 in the host device 200A and a transfer size acceptable to the semiconductor memory device 100A, the file is divided into smaller blocks for writing to the semiconductor memory device 100A. In FIG. 10, the file is divided into six blocks 1 to 6 for writing. In the semiconductor memory system shown in FIG. 10, following division by the command divider 240 of the host device 200A, the data buffer 250 stores data to be transferred and the command issuer 220 generates a write command and issues the command through the external interface 210. When data transfer between the host device 200A and the semiconductor memory device 100A and writing of data to the flash memory 140 in the semiconductor memory device 100A are completed, the data in the data buffer 250 is released and processing proceeds to next transfer. When transfer of the six blocks 1 to 6 shown in FIG. 10 is completed in this manner, transfer of the file is completed.

Figure 11:
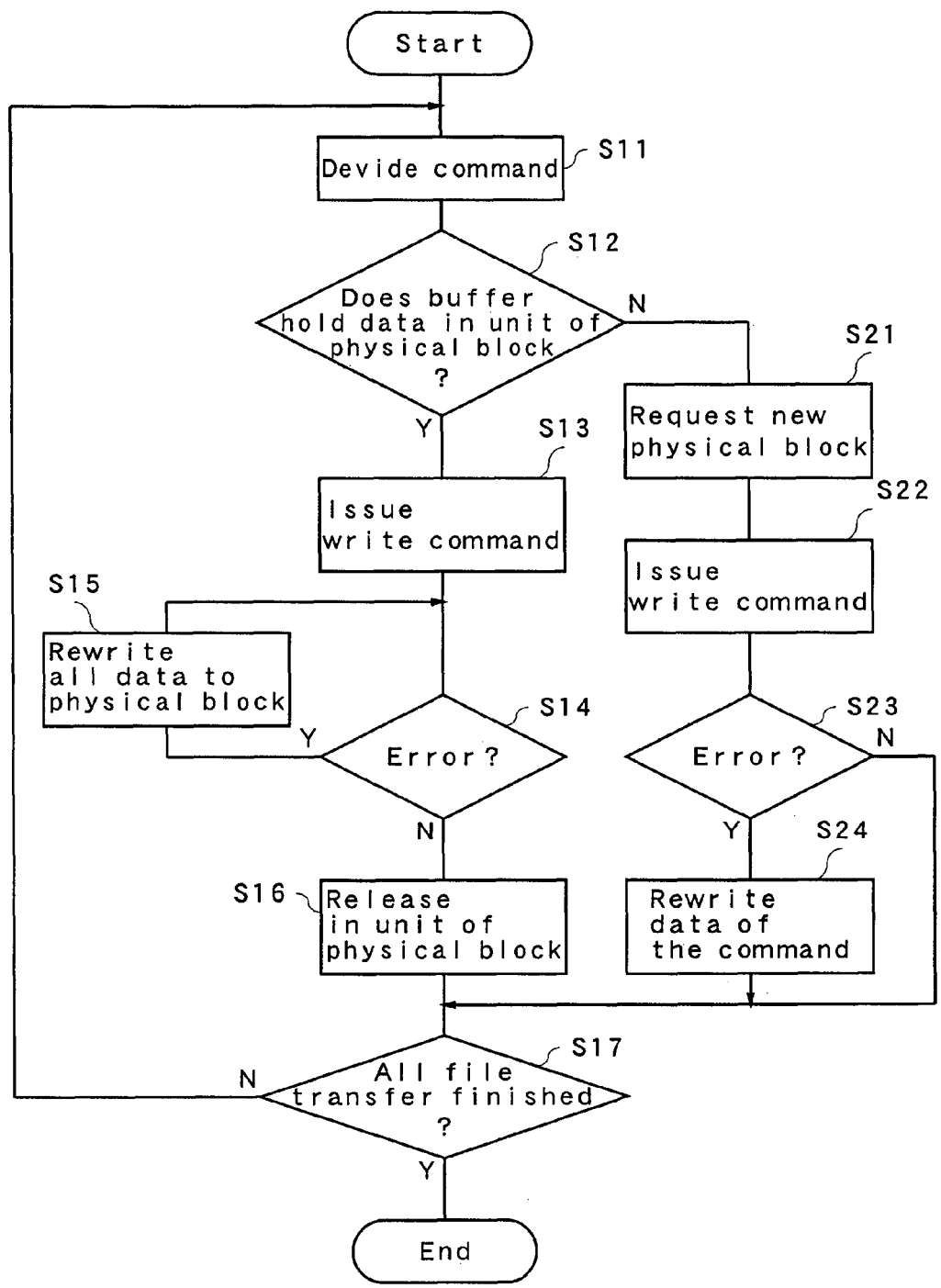
FIG. 11 is a flow chart showing the host device in accordance with the present embodiment of the present invention.

Next, overall operation of the host device 200A will be described below in detail. FIG. 11 is a flow chart showing the operation of the host device 200A. Here, a case where the host device 200A sequentially records the files 1, 2, 3 . . . in the semiconductor memory device 100A is described. When processing starts in FIG. 11, as shown in FIG. 10, the command divider 240 divides a command according to a file transfer size (S11). In the division procedure, information on the flash memory 140 is taken out from the semiconductor memory device 100A through the memory information informer 180. The command divider 240 divides the file to be written at the boundary of the physical block based on a physical block size held in the block boundary manager 260. It is confirmed whether or not the data already written in a physical block to which data is to be written next and data to be transferred next is held in the data buffer 250 (S12). When the data exists, the write command including the divided data is issued to the semiconductor memory device 100A (S13). When writing is finished without occurring any error, if data transferred in units of physical blocks exists in the data buffer 250, the data is released (S16). Subsequently, the procedure proceeds to S17, it is determined whether or not writing of all files finishes. When writing of all files does not finish, the procedure proceeds to S11, a remaining portion of the file is written again. When writing of the file is completed, transfer is finished. When an error occurs, the procedure proceeds from S14 to S15, data of the whole physical block including the data transferred according to the command is written again. Thereby, the data having the error in the physical block can be recovered.

On the contrary, when the data already written in the physical block to which data is to be written at S12 is not held in the data buffer 250, the procedure proceeds to S21. In this case, the host device 200A issues a command to request a new physical block and a write command (S21, S22). It is determined whether or not an error occurs due to this writing. When no error occurs, the procedure proceeds to S17. When the error occurs, only data which cannot be written according to the command is written again.

When the host device 200A issues the write command to the semiconductor memory device 100A, the address converter 120 converts the logical address at which the host device 200A requests writing into the physical address at which data is actually written. Additional writing is performed when a space in the physical block exists and a new physical block is secured when no space in the physical block exists. When a new physical block needs to be secured, the block manager 170 searches the free block management table 172 to secure the new physical block. After the new physical block is secured, the data writer 130 writes data to the flash memory 140.

Figure 12:
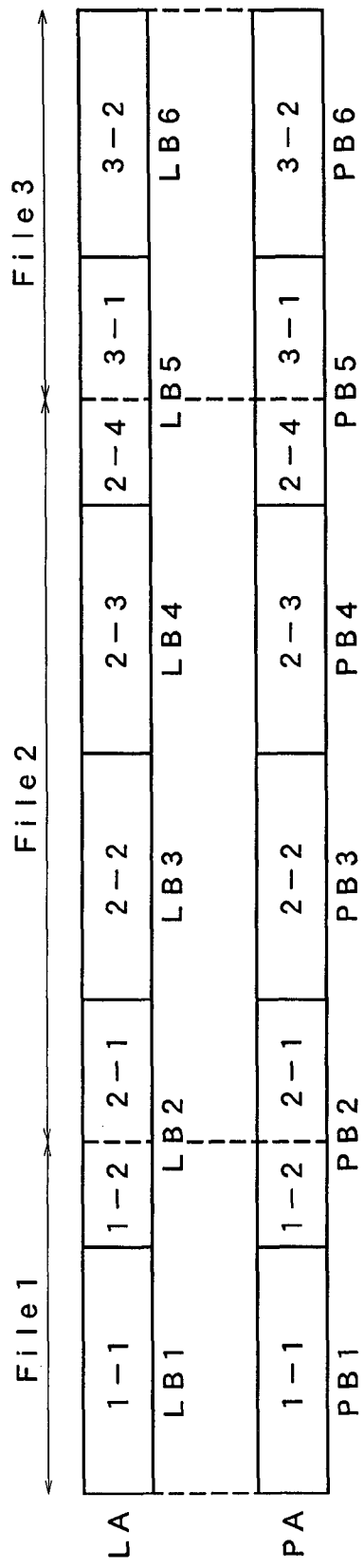
FIG. 12 is an explanatory diagram showing a specific normal operation in accordance with the present embodiment of the present invention.

Next, processing at S13 and subsequent steps will be described together with an operational example referring to FIG. 12 in more detail. FIG. 12 is a conceptual diagram showing a logical address space LA in an upper section thereof and a physical address space PA corresponding to the logical address space LA in a lower section thereof. First, a portion (1-1) of the file 1 is assigned to the logical block LB1 and this data is written to the physical block PB1. A portion (1-2) of the file 1 is assigned to the logical block LB2 and this data is written to a first half of the physical block PB2. When a file 2 is subsequently written, a portion (2-1) is assigned to the logical block LB2 and this data is written to a second half of the physical block PB2. At S12, it is confirmed whether or not the data buffer 250 holds data in the previous portion (1-2) of the file 1 therein, and when the data buffer 250 holds the data therein, data in the portion (2-1) is additionally written to the second half of the physical block PB2. When an error occurs during this writing, by writing the portions (1-2) and (2-1) of the files 1 and 2 again, safety of data in the physical block is ensured. At completion of transfer of the portion (1-2) of the file 1 in FIG. 12, the data release determinator 270 does not release data in the data buffer 250 and still stores the data in preparation for the occurrence of the error upon next writing of the portion (2-1) of the file 2. At completion of writing of the portion (2-1) of the file 2, the data release determinator 270 determines that data in the portion (1-2) of the file 1 and the portion (2-1) of the file 2 are released and releases data in the data buffer 250 (S16).

Figure 13:
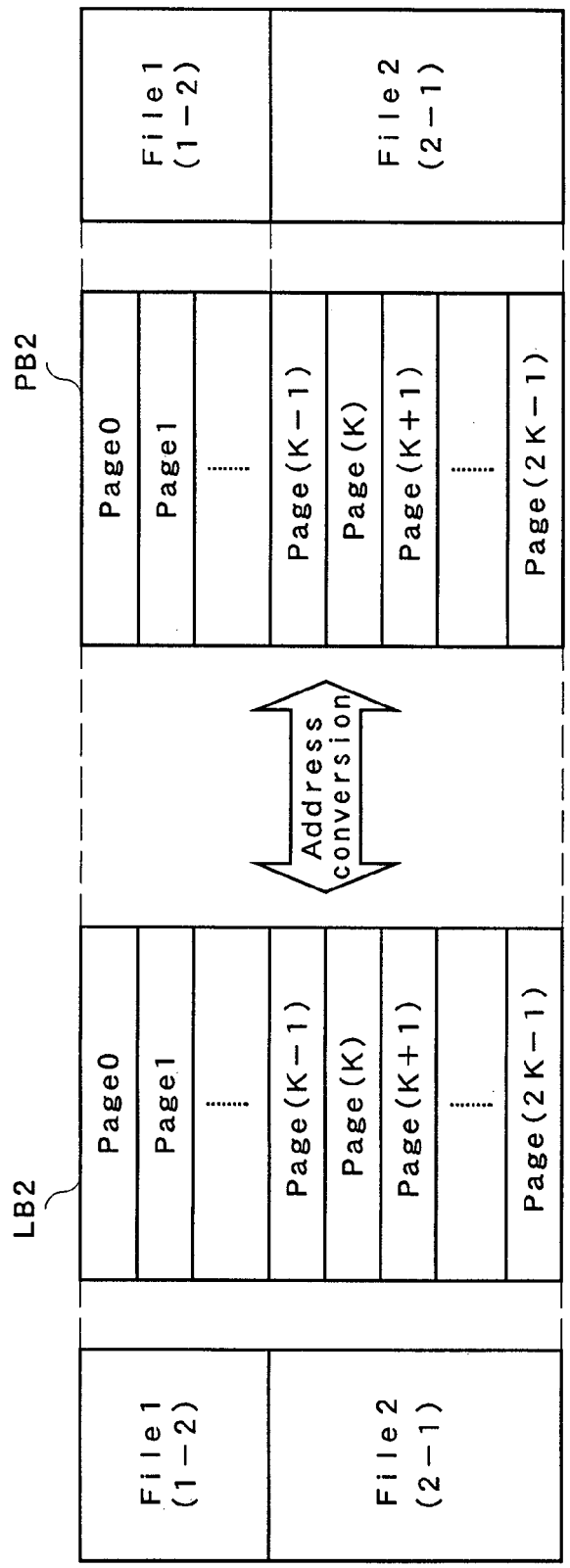
FIG. 13 is an explanatory diagram showing a procedure of additionally writing a file to a same physical block in accordance with the present embodiment.

This will be described in more detail referring to FIG. 13. As shown in FIG. 13, it is assumed that the portion (1-2) of the file 1 has been already written to a portion of the logical block LB2 in a left logical address space and the portion (1-2) of the file 1 is written to page 0 to (K−2) of the physical block PB2 corresponding to the logical block LB2. In this case, the portion (2-1) of the file 2 is additionally written to the physical block PB2.

Figure 14:
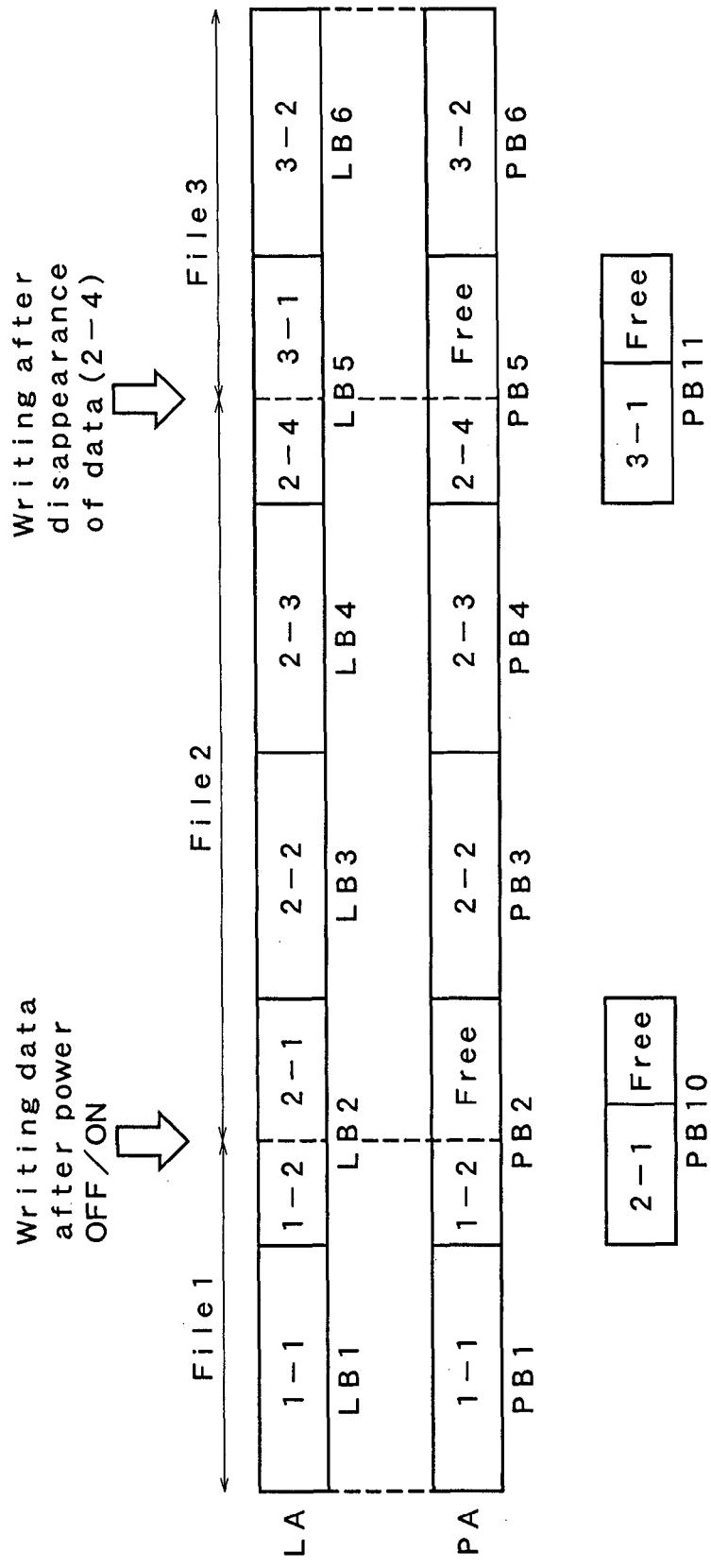
FIG. 14 is an explanatory diagram showing writing to a new physical block in accordance with the present embodiment of the present invention.

Furthermore, processing at S21 and subsequent steps will be described together with an operational example in more detail referring to FIG. 14. As in FIG. 12, the portion (1-1) of the file 1 is assigned to the logical block LB1 and this data is written to the physical block PB1. The portion (1-2) of the file 1 is assigned to the logical block LB2 and this data is written to the first half of the physical block PB2. It is assumed that, after writing of the file 1, the host device 200A and semiconductor memory device 100A are powered off and then, power is on again and the file 2 is written. Due to power-off, the data in the portion (1-2) of the file 1 in the data buffer 250 of the host device 200A is lost. Accordingly, at S12, it is determined that no data exists and the procedure proceeds to S21. In this case, prior to writing of the portion (2-1) of the file 2, the host device requests a new physical block. Then, for the logical block LB2, data is written to the portion (2-2) of the file 2. The semiconductor memory device 100A extracts a new physical block, for example, PB10, and data in the portion (2-1) of the file 2 is written to the block. Even if an error occurs during this writing, this does not affect the data in the portion (1-2) of the file 1, which is written to the physical block PB2. Therefore, by writing only the portion (2-1) of the file 2 again, data can be restored.

Figure 15:
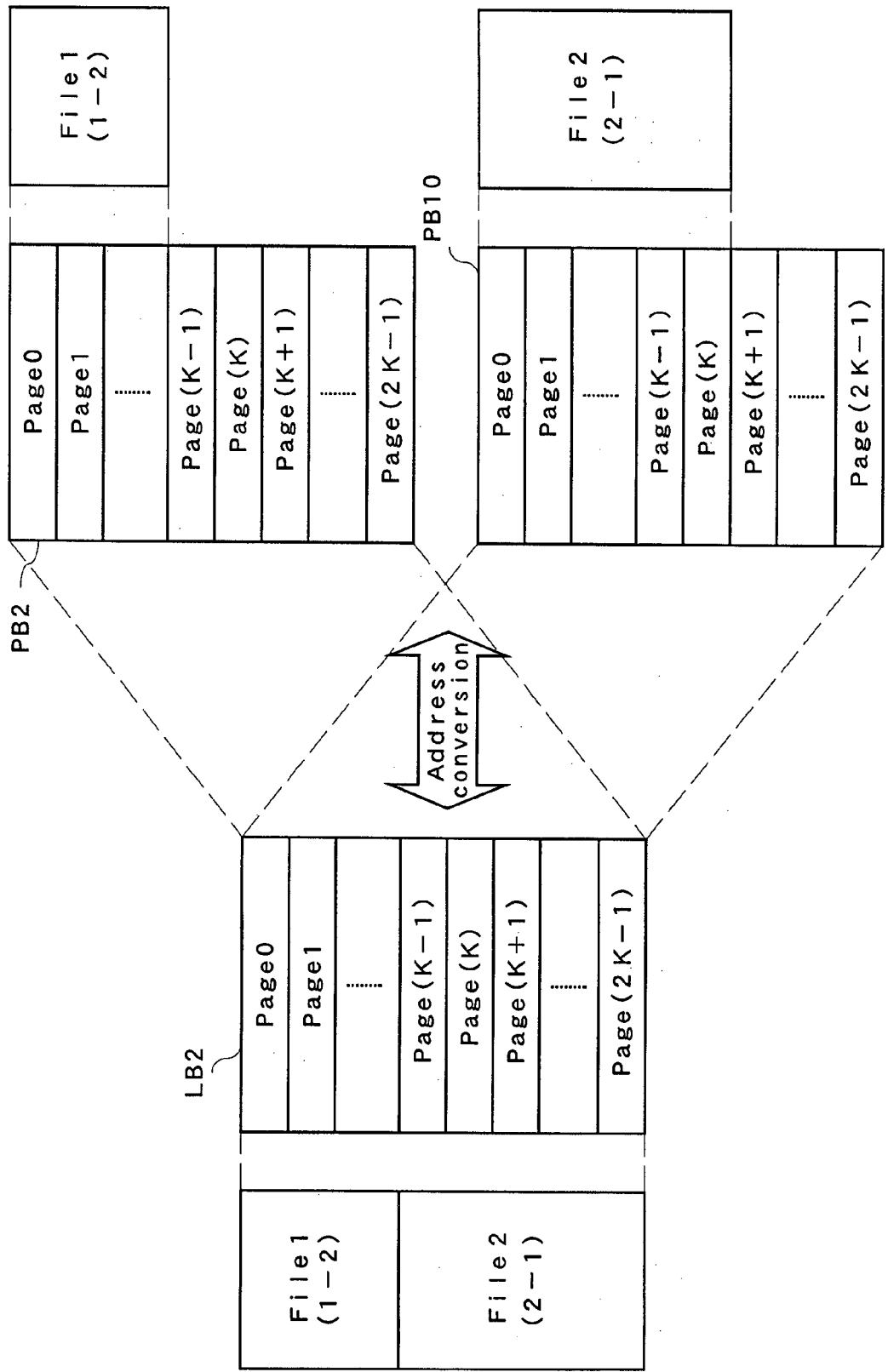
FIG. 15 is an explanatory diagram showing procedure of writing a file to another physical block in the present embodiment.

According to this method, the host device can write new data without destruction of the already written file before power-on. This will be described in more detail referring to FIG. 15. In FIG. 15, it is assumed that the portion (1-2) of the file 1 has been already written to a part of the logical block LB2 in a left logical address space and the portion (1-2) of the file 1 is written to page 0 to (K−2) of the physical block PB2 corresponding to the logical block LB2. Change in a state of the logical-physical conversion table 171 in this case will be described. FIGS. 16A and 16B are logical-physical conversion tables showing that the physical block PB2 in FIG. 15 is registered. That is, the logical block number LB2 in the main table 171a is assigned to the physical block PB2 in the physical address space.

In this state, the file (2-1) is additionally written to the logical block LB2. In this case, the new physical block PB10 is secured and the file (2-1) is written to the physical block PB10 without being additionally written to the physical block PB2. FIG. 16B is the auxiliary table 171b used in a case where the logical block includes two physical blocks. As shown in the auxiliary table 171b, the logical block LB2 is also assigned to the physical block PB10 on a lower right side. Thereby, even when power disconnection suddenly occurs during writing of the file (2-1), since the physical block PB10 is different from a physical block which holds the portion (1-2) of the file 1 therein, destruction of the file 1 can be prevented.

The data buffer 250 is a generally limited area and frequently secured and released according to processing by the host device 200A. According to the present invention, in preparation for the occurrence of error, in addition to data being transferred, data in an area subjected to error propagation is also held in the data buffer 250. However, when the area of data buffer 250 lacks, release of the data in the area subjected to error propagation is prioritized. Since the data buffer 250 is managed by the software of the host device 200A, it can be determined whether or not data is released and erased from the data buffer 250. Accordingly, in FIG. 14, it is assumed that, following writing of a portion (2-4) of the file 2, processing using the data buffer 250 is required in the host device 200A and thus, data in the portion (2-4) is released. In this case, at writing of a next portion (3-1) of a subsequent file 3, the data in the portion (2-4) does not exist in the data buffer 250. Consequently, the procedure proceeds to processing at S21 and subsequent steps to request a new physical block. The semiconductor memory device 100A extracts a new physical block, for example, PB11, and data in the portion (3-1) of the file 3 is written to the physical block PB11.

With such the configuration, since the host device holds the data subjected to error propagation, the number of cases can be reduced where the physical block is newly secured. By securing the new physical block for writing only when destruction of prior data is not permitted and then performing writing (into the secured physical block), an effect on the transfer speed and the number of times of writing can be reduced.

Figure 17:
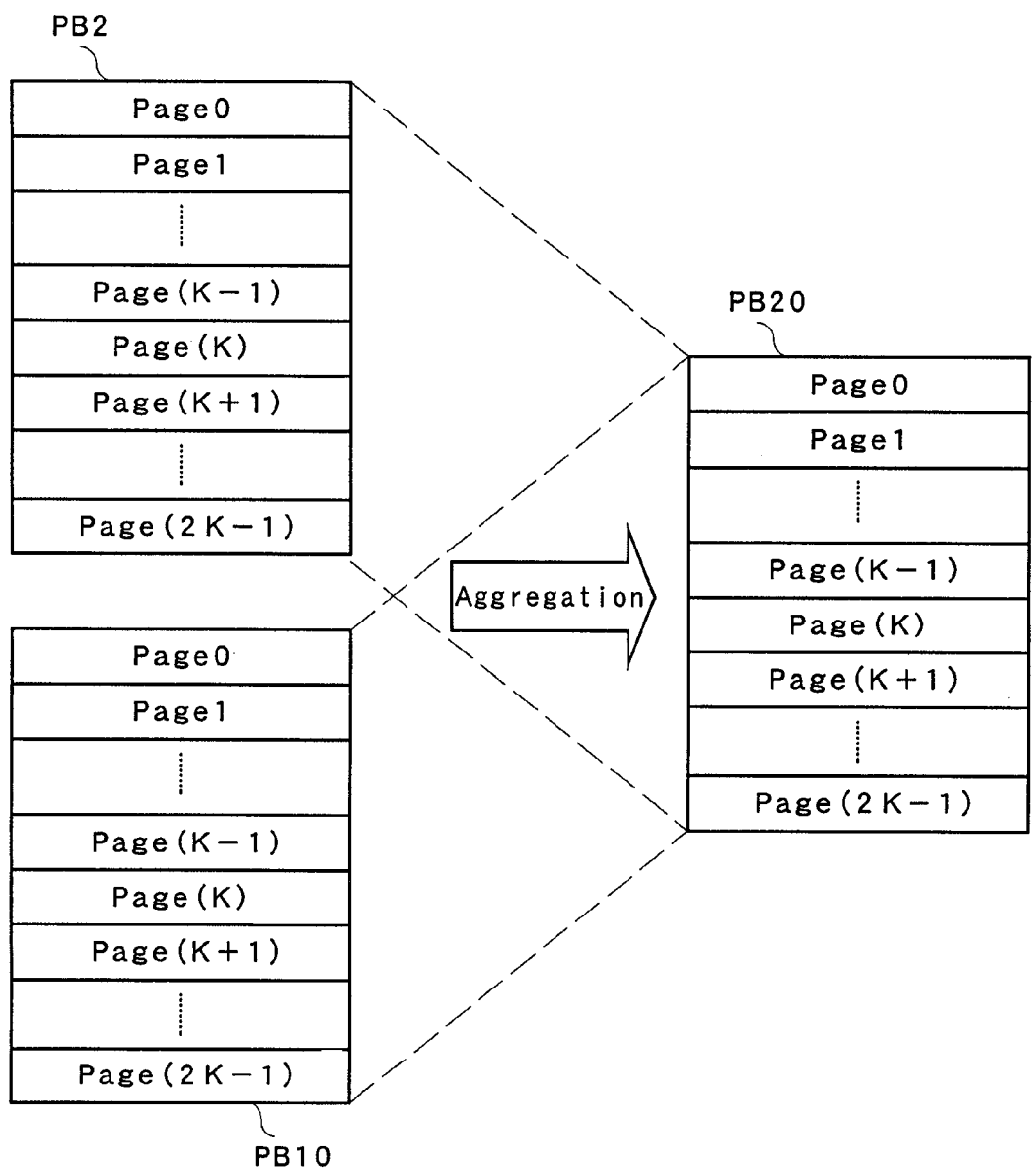
FIG. 17 is an explanatory diagram showing procedure of aggregating two physical blocks into one physical block in the present embodiment.

When the new physical block is secured and data is written to the new physical block despite that there is a space in the physical block, two physical blocks are required for one logical block, leading to a capacity problem. For this reason, it is needed to secure a new physical block to collect only valid pages from the two physical blocks and integrate the pages into one physical block at the time when data writing and reading is not performed. The integration processing will be described referring to FIGS. 17, 18A and 18B. In the integration processing, as shown in a right side of FIG. 17, a new physical block, here, PB20 is secured. Then, data in valid pages of the physical block PB2 and physical block PB10 corresponding to the same logical block LB2 is collected and the collected data is copied to the physical block PB20. When copying is completed, as shown in FIGS. 18A and 18B, the physical block PB20 is registered with respect to the logical block LB2 in the main table 171a and, an invalid number A is registered with respect to the logical block LB2 in the auxiliary table 171b.

(Second Embodiment)

Figure 19A:
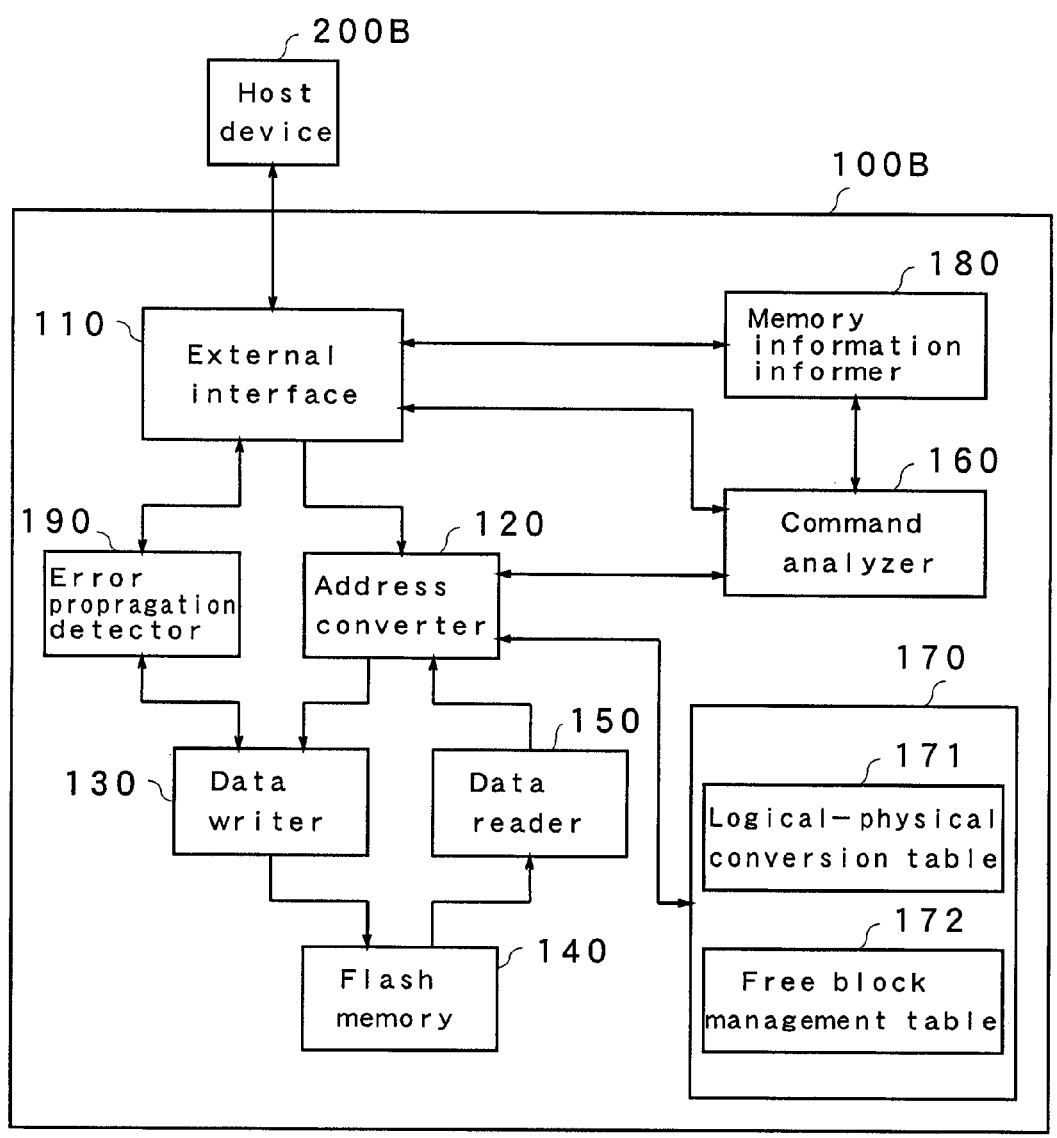
FIG. 19A is a configuration diagram showing a semiconductor memory device in accordance with a second embodiment of the present invention.

Next, the second embodiment of the present invention will be described. FIG. 19A shows a configuration of a semiconductor memory device 100B in accordance with a second embodiment and FIG. 19B shows a configuration of a host device 200B. As shown in FIG. 19A, in the semiconductor memory device 100B, an error propagation detector 190 is connected to the data writer 130. The error propagation detector 190 determines whether or not data is written to a second page of the flash memory and an error can propagate as a result of the writing, and when the error actually occurs, the error propagation detector 190 informs error propagation possibility to the host device 200B through the external interface 110. In a case of receiving the error propagation possibility through the external interface 210, a command issuer 280 of the host device 200B issues a command to rewrite data in unit of physical blocks. The other operation of the command issuer 280 is the same as that of the command issuer 220.

Figure 20:
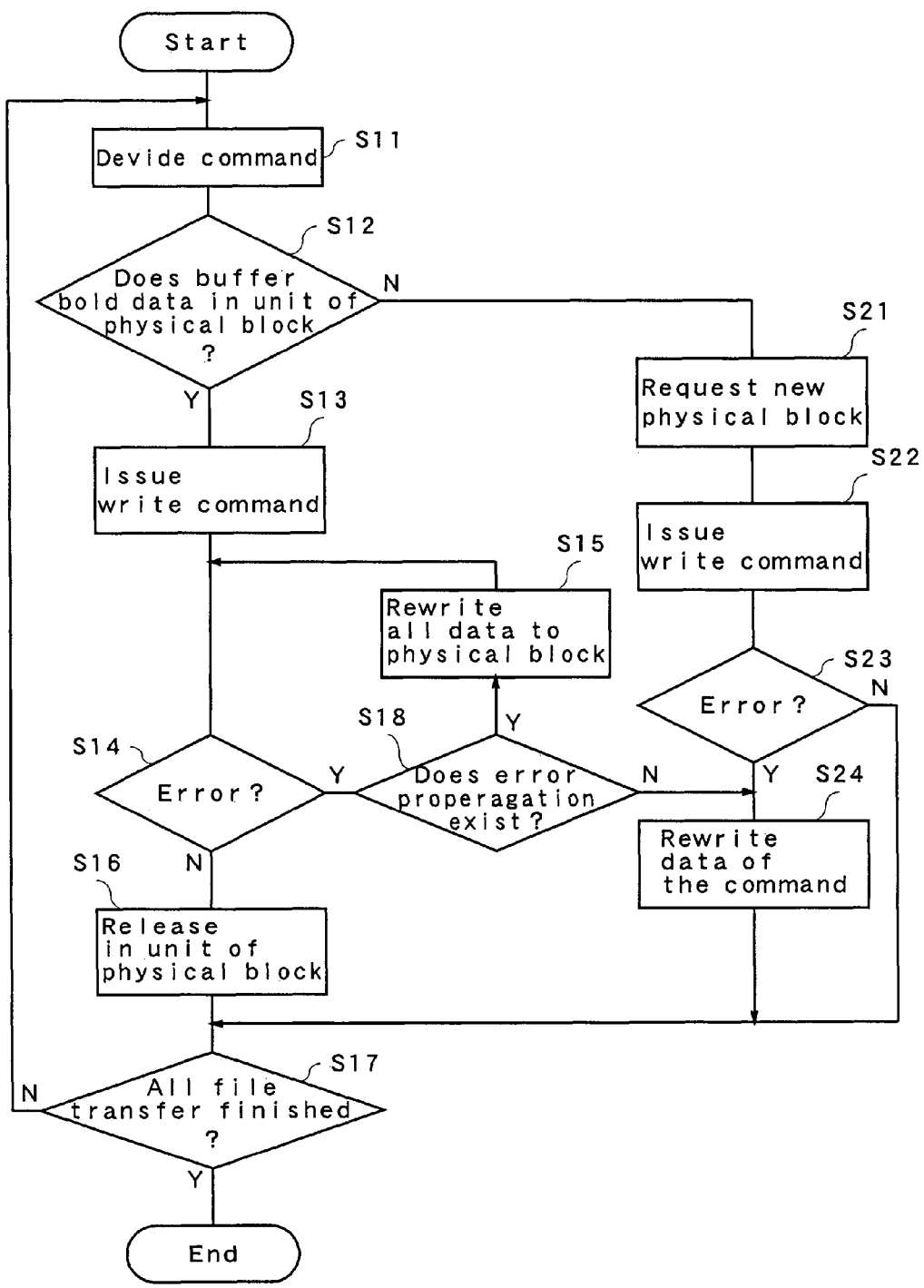
FIG. 20 is a flow chart showing operation of the host device in accordance with the present embodiment.

Next, operation in the second embodiment will be described by using a flow chart of FIG. 20. Same parts in FIG. 20 as those in the first embodiment are given the same step numbers and description thereof is omitted. When an error exists at step S14, the host device 200B waits for data subjected to error propagation. When the error exists in the second page, the error propagation detector 190 identifies a range in which the error can propagate due to cell sharing, and informs whether or not the error propagation due to cell sharing occurs at occurrence of the writing error to the host device 200B. At S18, when the error propagation due to cell sharing does not occur, the procedure proceeds to S24, the command issuer 280 of the host device 200B reissues only a write command with error as a new write command. On the contrary, when the error propagation due to cell sharing occurs, the procedure proceeds to S15, the command issuer 280 issues the write command to the whole of the physical block. This process can optimize retransmitted data.

Both a case of recording of an image from the host device to the semiconductor memory device and a case of writing a file to the semiconductor memory device from the host device as a personal computer (PC) can obtain the same effect.

Although the number of bits stored in one memory cell of the multi-level flash memory is two in the first and second embodiments of this application, as a matter of course, the present invention can be applied to a more advanced flash memory in which the three bits or more can be stored in one memory cell.

Even when the present invention is applied to a nonvolatile memory other than the flash memory, a similar effect can be obtained. Although the semiconductor memory device records data transferred from the host device therein in the present embodiment, a device which has the semiconductor memory device in the host device can achieve a similar effect.

Although the physical block is described as a minimum erasing unit herein, since the physical block is defined as a block corresponding to the logical block, a size of the physical block may be different from the erasing unit. In this case, the one physical block may have the size as an integral multiple of a minimum erasing unit. In this case, a current state for each erasing unit needs to be managed by a free block management table or the like. The erasing unit can be regarded as a group having a memory sharing relationship in the multi-level flash memory.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese application No. 2009-001442 filed on Jan. 7, 2009 is hereby incorporated by reference.

What is claimed is:

1. A semiconductor memory system comprising:
   a host device; and
   a semiconductor memory device, wherein said semiconductor memory device includes:
   a nonvolatile memory composed of a plurality of physical blocks;
   a data writer for writing data to said nonvolatile memory;
   a data reader for reading data from said nonvolatile memory;
   a memory manager having a logical-physical conversion table recording correspondence between a logical block according to a command issued from the host device and physical block of said nonvolatile memory, the memory manager converting a logical address given from said host device into a physical address of said nonvolatile memory; and
   a memory information informer for informing memory information on said nonvolatile memory,
   wherein said host device includes:
   a block boundary manager for managing a boundary of the physical block as a writing unit based on the memory information informed from said memory information informer of said semiconductor memory device, and for identifying a range of error propagation based on the size and boundary of the physical block;
   a command divider for dividing data to be written and a write command based on an access unit from said block boundary manager to the physical block;
   a data buffer for storing data to be written upon issuing a write command;
   a command issuer for issuing a write command to said semiconductor memory device, and in a case of a writing error occurs at writing to said semiconductor memory device, reading data to be written to a block in which a writing error occurs from said data buffer and reissuing the write command; and
   a data release determinator for determining whether or not data stored in said data buffer is released based on an error propagation range.

2. The semiconductor memory system according to claim 1, wherein said data release determinator determines that the data of said data buffer is released when data transfer is completed in units of physical blocks.

3. The semiconductor memory system according to claim 1, wherein when an error occurs, said command issuer reissues a write command to the whole of the physical block when data in unit of physical blocks exists in said data buffer, and reissues the command with error when no data in unit of physical blocks exists in said data buffer.

4. The semiconductor memory system according to claim 1, wherein said host device further includes a new block writing request part for requesting writing to a new block at writing of data when said data buffer does not hold data recorded in the block to which the data is to be written in said semiconductor memory device.

5. The semiconductor memory system according to claim 4, wherein said new block writing request part requests writing to the new block when a first write command after power-on is issued.

6. The semiconductor memory system according to claim 1, wherein said semiconductor memory device further includes an error propagation detector for determining whether or not the error affects an area other than an address area of the command as an error status when the write command leads to the writing error, and informing the error status to said host device, and said command issuer reissues the write command to the whole of a predetermined physical block when the error status shows that the error affects an area other than the address area of the command, and reissues the command leading to the writing error when the error status shows that the error does not affect an area other than the address area of the command.

7. The semiconductor memory system according to claim 1, wherein said nonvolatile memory is a multi-level flash memory and given that units sharing a memory cell are regarded as a group, said physical block includes at least one group.

8. The semiconductor memory system according to claim 1, wherein said physical block is one of a minimum erasure unit and an integral multiple of the minimum erasing unit of said memory.

9. A host device connected to a semiconductor memory device comprising:
   a block boundary manager for managing a boundary of a physical block as a writing unit based on the memory information on said semiconductor memory device, and for identifying a range of error propagation based on the size and boundary of the physical block;

a command divider for dividing data to be written and a write command based on an access unit from said block boundary manager to the physical block;

a data buffer for storing data to be written at issuance of a write command;

a command issuer for issuing a write command to said semiconductor memory device, and when a writing error occurs at writing to said semiconductor memory device, reading data to be written to the block in which a writing error occurs from said data buffer and reissuing the write command; and a data release determinator for determining whether or not data stored in said data buffer is released based on an error propagation range.

10. The host device according to claim 9, wherein said data release determinator determines that said data buffer is released when data transfer in units of physical blocks is completed.

11. The host device according to claim 9, wherein when the error occurs, said command issuer reissues a write command to the whole of the physical block when data in unit of physical blocks exists in said data buffer, and reissues the command with the error when no data in unit of physical blocks exists in said data buffer.

12. The host device according to claim 9, wherein said host device further includes a new block writing request part for requesting writing to a new block at writing of data when said data buffer does not hold data recorded in the block to which the data is to be written in said semiconductor memory device.

13. The host device according to claim 12, wherein said new block writing request part requests writing to the new block when a first write command after power-on is issued.

* * * * *